US009025948B2

(12) United States Patent
Tages et al.

(10) Patent No.: US 9,025,948 B2

(45) Date of Patent: May 5, 2015

(54) CAMERA PROTECTION MODULE FOR PORTABLE DEVICE CASE

(75) Inventors: Fernando Tages, Coral Springs, FL (US); Daniel Acero, Miramar, FL (US)

(73) Assignee: A.G. Findings & Mfg. Co., Inc., Fort Lauderdale, FL (US)

( * ) Notice: Subject to any disclaimer, the term of this patent is extended or adjusted under 35 U.S.C. 154(b) by 270 days.

(21) Appl. No.: 13/290,458

(22) Filed: Nov. 7, 2011

(65) Prior Publication Data

US 2012/0321294 A1 Dec. 20, 2012

Related U.S. Application Data

(60) Provisional application No. 61/498,746, filed on Jun. 20, 2011.

(51) Int. Cl.

| | |
|---|---|
| ***G03B 17/02*** | (2006.01) |
| ***H04N 5/225*** | (2006.01) |
| ***B28B 1/14*** | (2006.01) |
| ***G03B 17/56*** | (2006.01) |
| ***G03B 11/04*** | (2006.01) |
| ***G03B 17/48*** | (2006.01) |
| *B29L 31/34* | (2006.01) |

(52) U.S. Cl.

CPC .............. *H04N 5/2254* (2013.01); *G03B 17/02* (2013.01); *G03B 17/568* (2013.01); *B29L 2031/3437* (2013.01); *G03B 11/04* (2013.01); *G03B 17/48* (2013.01); *B28B 1/14* (2013.01)

(58) Field of Classification Search

USPC .................. 396/535, 429; 348/373; 359/511; 264/299; 206/316.1, 316.2; 455/575.8

See application file for complete search history.

(56) References Cited

U.S. PATENT DOCUMENTS

| | | | |
|---|---|---|---|
| D642,170 S | 7/2011 | Johnson et al. | |
| D665,386 S | 8/2012 | Fathollahi | |
| 2001/0017663 A1* | 8/2001 | Yamaguchi et al. | 348/373 |
| 2005/0115852 A1* | 6/2005 | Funahashi et al. | 206/316.2 |
| 2005/0162543 A1* | 7/2005 | Kobayashi | 348/371 |
| 2008/0193113 A1* | 8/2008 | Yeom | 396/27 |
| 2011/0195759 A1* | 8/2011 | Griffin et al. | 455/575.1 |
| 2012/0018323 A1 | 1/2012 | Johnson et al. | |

* cited by examiner

*Primary Examiner* — Rochelle-Ann J Blackman

(74) *Attorney, Agent, or Firm* — Christopher & Weisberg, P.A.

(57) ABSTRACT

A mobile device case defining an aperture and a camera protection module within the aperture. The camera protection module may be a separate element from the case shell or may be formed as an integral part of shell.

9 Claims, 7 Drawing Sheets

CAMERA PROTECTION MODULE FOR PORTABLE DEVICE CASE

CROSS-REFERENCE TO RELATED APPLICATION

This application is related to and claims priority to U.S. Provisional Application Ser. No. 61/498,746, filed Jun. 20, 2011, the entirety of which is incorporated herein by reference.

STATEMENT REGARDING FEDERALLY SPONSORED RESEARCH OR DEVELOPMENT n/a

FIELD OF THE INVENTION

The present invention relates to portable devices, and in particular, to a protective camera protection module for a portable device case.

BACKGROUND OF THE INVENTION

As mobile phones and other mobile electronic devices become more technologically advanced and include more features, so have the protective cases used to protect these devices. To prophylactically protect such devices from damage or breakage, protective cases have been devised to reduce the risk that a mobile device may break if it is dropped or otherwise exposed to an impact force.

In particular, two types of materials have generally been employed to reduce the impact force on a mobile device, namely, elastic or resilient materials that absorb impact forces ("soft cases") and fracture-resistant plastics ("hard cases"). Mobile device cases typically include one or the other of these materials, or include both a softer resilient gel-like skin surrounding a harder plastic shell. Such mobile device cases typically include various openings to allow access to features of the device. In particular, many mobile devices have integrated cameras on the front and/or back of the device. As such, corresponding openings in the mobile device case allow the camera to operate while the mobile device is disposed within the case.

However, many mobile device cameras include an electronic flash element adjacent a camera lens to better illuminate the subject of the image. Owing to the lens' proximity to the flash on mobile devices, images may often appear hazy as bright light from the flash interferes with the image capture process. Adding a case around the mobile device with a camera may also create flash reflection and impact the dispersion of light from the flash, resulting in overexposure of the photographic images. Also, when light from the flash reflects off the mobile device case surface, it causes the color of the photograph to be tinted with the color of the cases if the case is any non-black color. This is typically not a consideration with stand-alone cameras, as the flash is often separated from the lens by a divider or other separation element integrated with the camera. However, correcting this problem with existing mobile phone cases that simply provide one aperture for both the lens and the flash remains an issue.

Therefore it is desirable to have a portable device case and associated elements that addresses the issues with existing mobile device cases discussed above.

SUMMARY OF THE INVENTION

The present invention advantageously provides a mobile device case defining an aperture and a camera protection module within the aperture.

In another embodiment, the system includes a mobile device case defining a first aperture and a second aperture. The first aperture is sized to surround a lens of a mobile device camera. The second aperture is spaced from the first aperture and is sized to surround a flash of the mobile device camera. The mobile device case includes a septum disposed between the first aperture and the second aperture.

In yet another embodiment, a method of manufacturing a camera protection module for a mobile device case includes molding at least a portion of a mobile device case. The molded portion of the mobile device case has a first aperture sized to surround a lens of a mobile device camera and a second aperture spaced from the first aperture and sized to surround a flash of the mobile device camera. The mobile device case further has a septum disposed between the first aperture and the second aperture.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
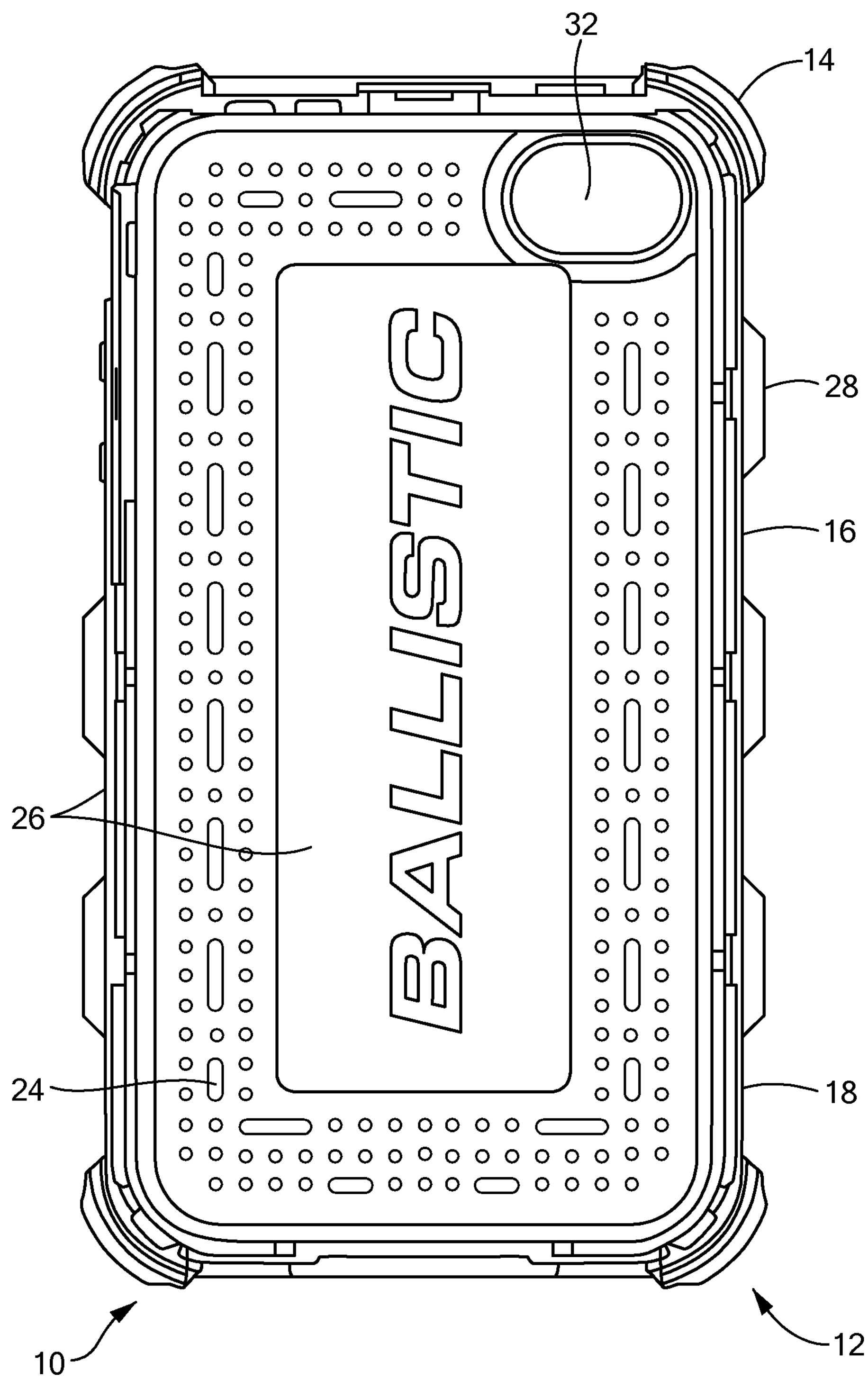
FIG. 1 is a top inside view of a first portion of a mobile device constructed in accordance with the principles of the present invention.

Now referring to the drawings in which like reference designators refer to like elements, there is shown in FIG. 1 a mobile device case constructed in accordance with the principles of the present invention and designated generally as "10." The mobile device case 10 may include a housing 12 sized to receive a mobile device. For example, the housing 12 may be sized and dimensioned based on the desired mobile device to be retained within. The housing 12 may include a first portion 14 defining dimensions to substantially contour the mobile device disposed within. The first portion 14 may include a side wall 16 defining a perimeter 18 of the first portion 14. The side wall 16 may operate to enclose the mobile device with the housing 12 and may define a height substantially commensurate with the height of the mobile device.

Figure 2:
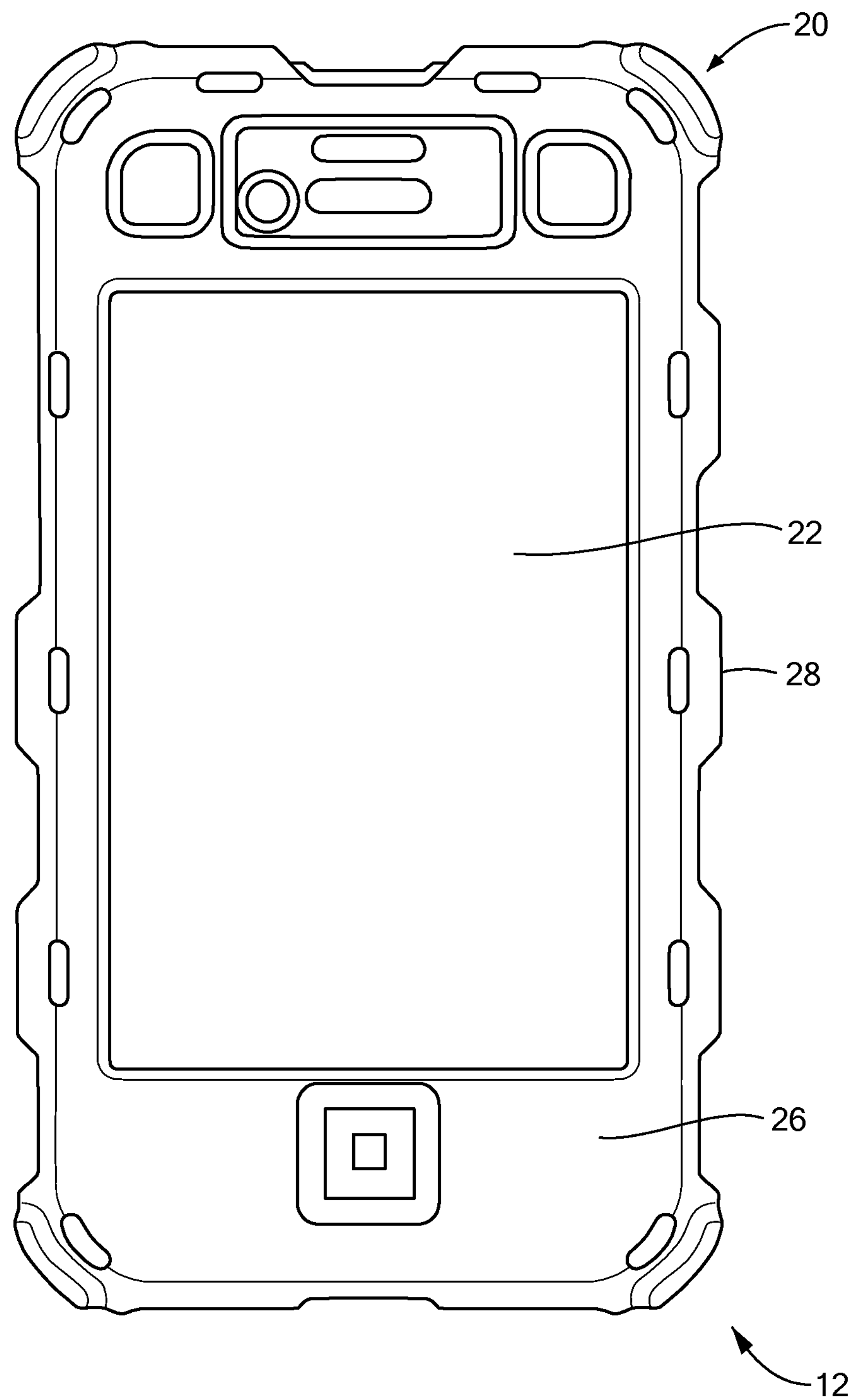
FIG. 2 is a top outside view of a second portion of a mobile device case in accordance with the principles of the present invention.

Now referring to FIG. 2, the housing 12 may further include a second portion 20 being sized and dimensioned to removeably mate with the first portion 14. In particular, the second portion 20 may include one or more tabs and/or grooves sized to mate with corresponding tabs and/or grooves on the first portion 14. The second portion 20 operates to enclose the mobile device case within the first portion 14. The second portion may further define a flexible membrane 22 commensurate in size with a touch-screen on the mobile device. The flexible membrane 22 allows the user to operate the touch-screen of the mobile device while providing protection against liquids, scratches and other damage to the touch-screen. Alternatively, the flexible membrane 22 may be affixed directly to the mobile device and be a separate component from the mobile device case 10.

The housing 12 may include multiple layers of material to provide a durable and resilient structure to the mobile device case. For example, the first portion 14 and/or the second portion 20 may be composed of, for example, thermoplastic polyurethane (TPU) or material with similar durometer hardness to cushion the mobile device within the housing 12. For example, as shown in, FIG. 1 a first layer of material 24 is included on the first portion 14 defining a substantially closed loop on the interior of the first portion 14.

The housing 12 may further define a second layer material 26, for example, polycarbonate or a material with a similar durometer hardness that defines the structure of the housing 12. The second layer of material 26 may be substantially rigid material, for example, polycarbonate (PC) or polycarboxylic acid (PCA), or a material with similar durometer, to provide durability to the housing 12. A third layer of material 28 may be disposed on both the first portion 14 and the second portion 20 and be composed of, for example, TPU or similar durometer material to that of the first layer of material 24. In an exemplary embodiment, the second later of material 26 is sandwiched between the first layer of material 24 and the third layer of material 28.

Figure 3:
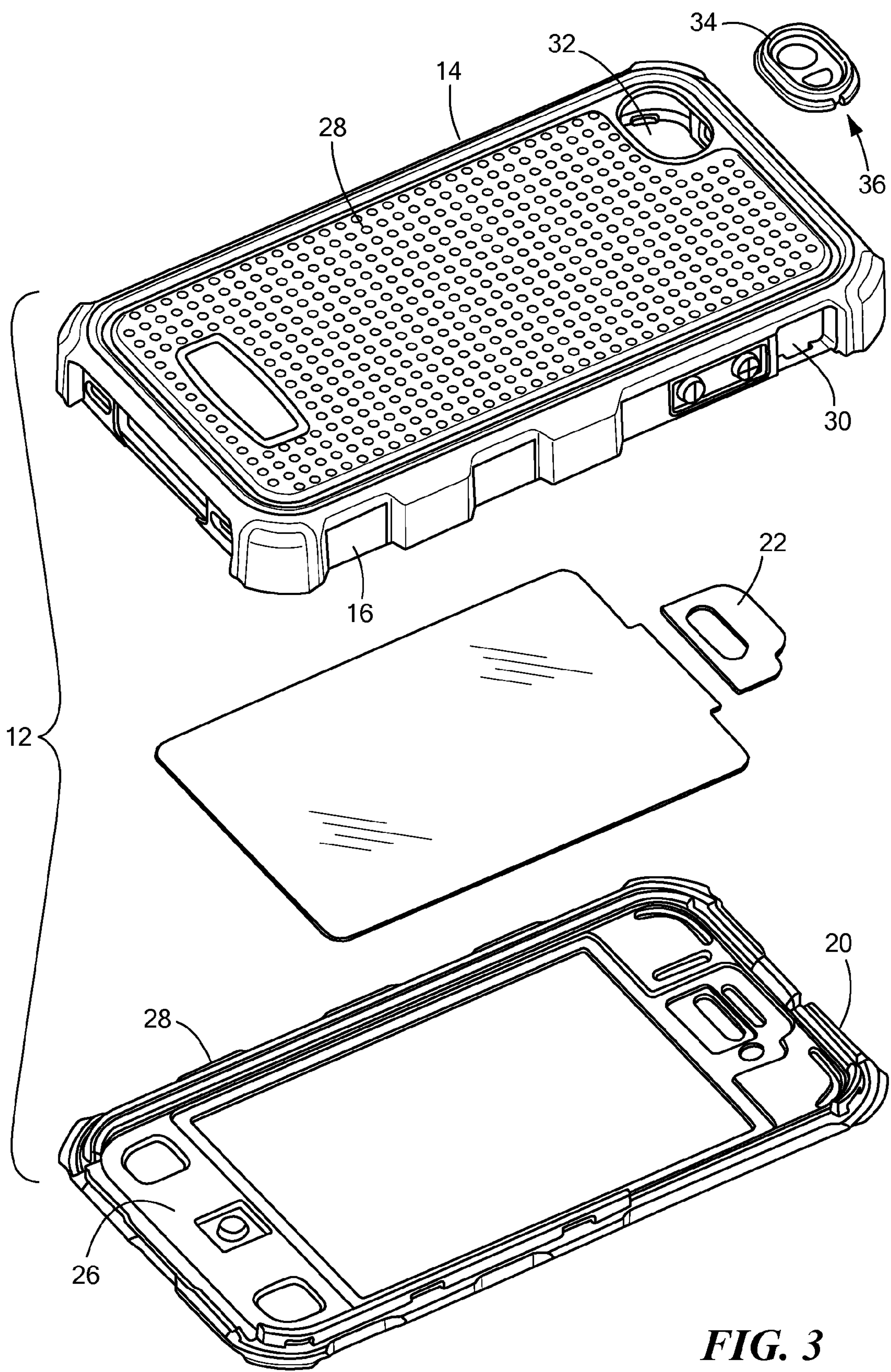
FIG. 3 is an exploded perspective view of the first and second portions of the mobile device case shown in FIGS. 1 and 2 including an embodiment of a camera protection module constructed in accordance with the principles of the present invention.

Now referring to FIG. 3, where the second portion 20 is shown as defining a height substantially less the height of the first portion 14, the height of the second portion 20 and the first portion 14 may define any height respectively, such that the height of the first portion 14 and the height of the second portion 20 are dimensioned to enclose the mobile device. One or more apertures 30 may be defined by the housing 12. The apertures 30 are sized to accommodate and/or provide access to one or more controls or features of the mobile device. For example, apertures 30 may be defined by the first portion 14 to provide access to the volume controls, on/off switches, and a lens and a flash of a camera lens on the mobile device. In particular, the first portion 14 may define a camera aperture 32 sized to receive a camera protection module 34.

Figure 4:
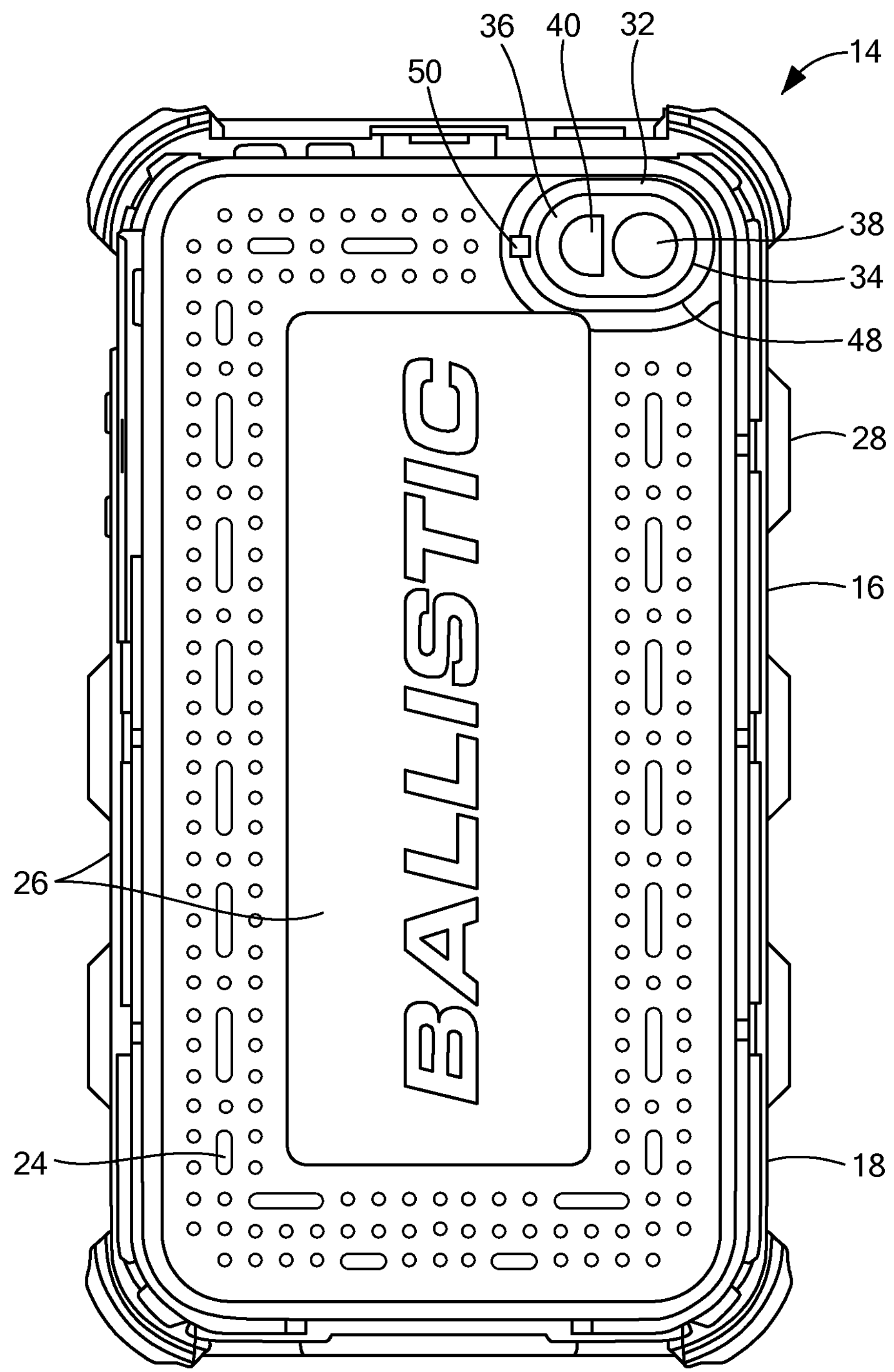
FIG. 4 is a top inside view of the first portion of the mobile device case showing the camera protection module installed.
Figure 5:
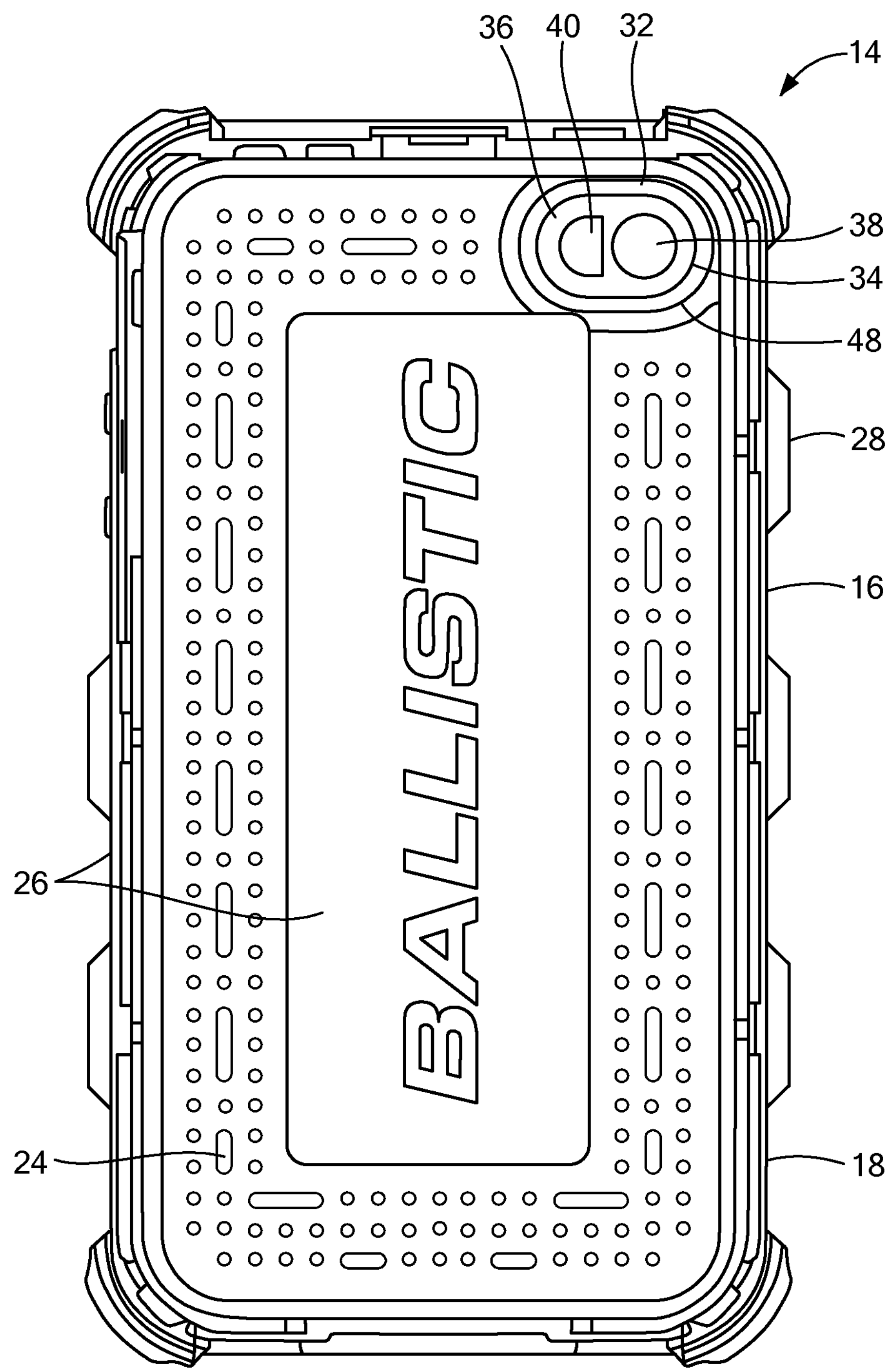
FIG. 5 is a top inside view of the first portion of the mobile device case showing the camera protection module molded as part of the housing.

Now referring to FIGS. 4-5, the camera protection module 34 may include a base element 36 receivable within the aperture 32 or otherwise affixable or to the first portion 14 proximate a mobile device camera when the mobile device is retained with the housing 12. The base element 36 may be substantially oval in shape, or any shape. For example, if the aperture 32 is substantially rectangular in shape, the base element 36 may define substantially rectangular dimensions sized to snap-fit within the aperture 32. The base element 36 may be composed of a resilient material, for example, TPU, silicon, or a rigid material, for example, PC, PCA, or a combination thereof. For example, a portion of the camera protection module 34 that protrudes into the interior of the first portion 14 may be composed of silicon or TPU, and the portion of the camera protection module 34 that extends into the back side (the outside) of the first portion 14 may be composed of PC. Alternatively, as shown in FIG. 5, the camera protection module 34 may be molded and formed as a portion of the housing 12. For example, the camera module 34 may be formed from a portion of the first portion 14.

The camera protection module 34 may define more than one opening, such as, a first aperture or orifice 38 sized to accommodate the lens and viewing angle of the camera of the mobile device and a second aperture or orifice 40 sized to accommodate the flash and flash dispersion of the camera when the mobile device is installed in the housing 12. In particular, the first orifice 38 may define a larger size or diameter compared to the second orifice 40. The first aperture 38 may further be substantially circular in shape to correspond to the shape of the lens, and the second aperture 40 may be substantially semi-circular in shape, round, or any other shape to accommodate the flash and to provide a partition between the first aperture 38 and the second aperture 40. In other embodiments, the shape of the first aperture 38 and the second aperture 40 may be selected depending on the shape of the lens and flash respectively of the particular mobile device.

Figure 6:
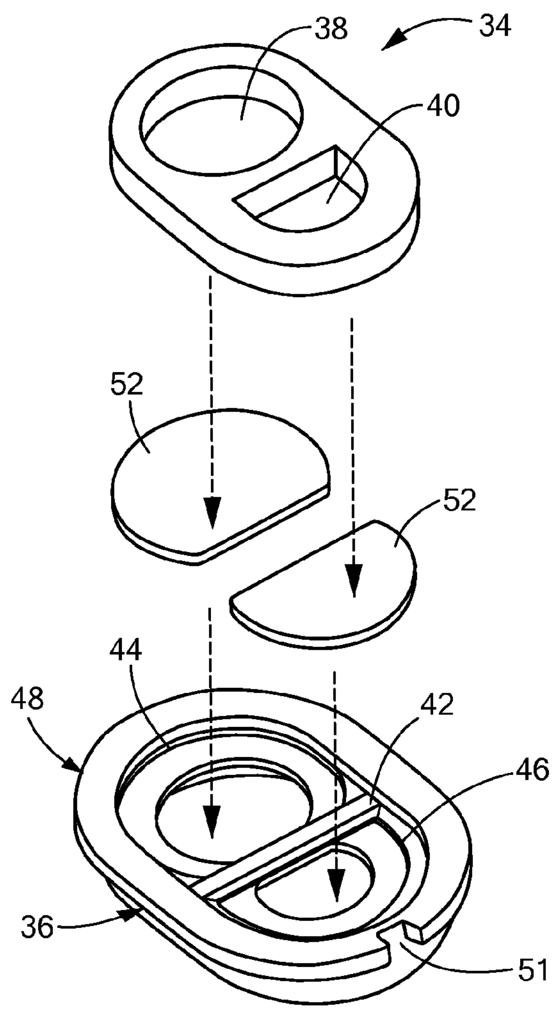
FIG. 6 is an exploded bottom perspective view of an exemplary camera protection module in accordance with the principles of the present invention.

The camera protection module 34 may also include a septum 42 disposed between the first aperture 38 and the second aperture 40. As shown in FIGS. 4-6, the septum 42 may be any suitable shape, for example substantially linear, and may define the linear portion of the second aperture 40. The septum 42 may operate, in part, to shield the light emitted from the flash from interfering with the image capture element of the camera lens. In particular, both the lens and the flash may be recessed a distance from the septum 42 when the base element is disposed adjacent the lens and the flash, such that light scattering from the flash during operation is at least partially blocked, in part, by the septum 42. The septum 42 may be integrated with the base element 36, or may be a separate element removeably insertable within the base element 36. For example, the septum 42 may be a separate component that snap fits or otherwise connects within the base element 36, such that the septum 42 may be removed if the mobile device disposed within the device case 10 does not include a flash.

Figure 7:
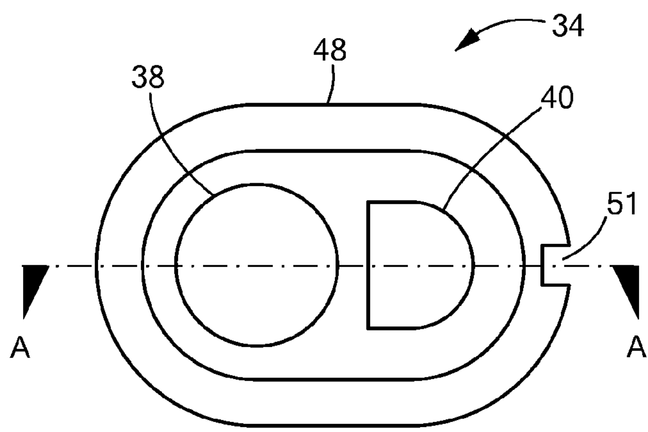
FIG. 7 is a bottom view of the camera protection module shown in FIG. 4.
Figure 8:
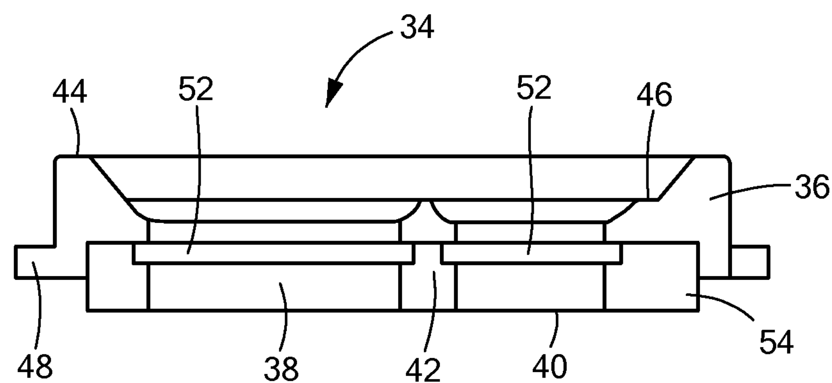
FIG. 8 is a cross-sectional view taken through section A-A in FIG. 7.

Now referring to FIGS. 6-8, to further avoid the flash operation from interfering with the camera operation, the camera protection module 34 may define a first tapered portion 44 surrounding the first aperture 38 and a second tapered portion 46 surrounding the second aperture 40. The first tapered portion 44 and the second tapered portion 46 may define a larger size or diameter distal from the camera and lens respectively, when the camera protection module 34 is coupled to the housing 12 and define a smaller diameter proximate the camera and lens. For example, the first tapered portion 44 and the second tapered portion 46 may extend upward and outward from the camera protection module 34. The first tapered portion 44 and the second tapered portion 46 may cooperate to allow for an increased amount of light to be emitted from the flash, and provide an increased viewing angle for the lens, yet avoid interference from the flash with the image capture element in the camera lens.

The camera protection module 34 may further have a lip 48 defining the perimeter of the camera protection module 34. As shown in FIG. 6, the lip 48 may be substantially co-planar with the largest diameter portions of the first tapered portion 44 and the second tapered portion 46. Various couplings are contemplated, for example, the lip 48 may operate to couple to the camera protection module 34 to the housing 12. For example, the first portion 14 may define a first alignment element 50 (See FIG. 4), for example, a tab sized to mate or otherwise releaseably secure with a corresponding second alignment element 51, for example, a groove defined by the lip 48.

Figure 9:
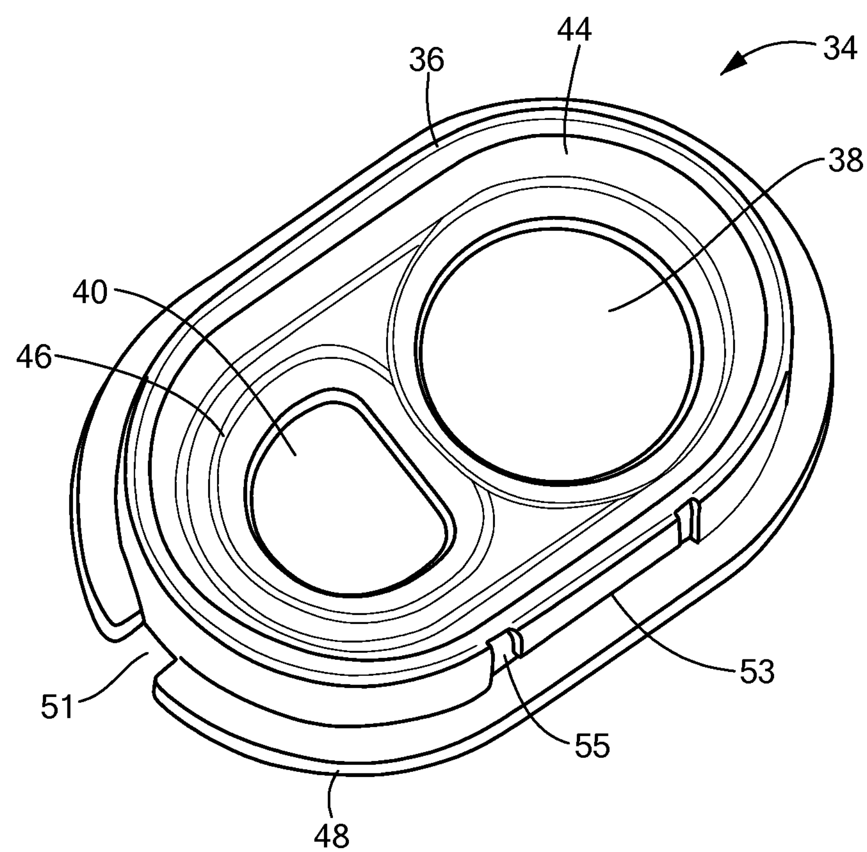
FIG. 9 is a top perspective view of the camera protection module shown in FIG. 4.

Now referring to FIG. 9, in an exemplary installation, the camera protection module 34 may be removeably insertable into the camera aperture 32 such that when fully inserted, the camera protection module 34 snaps into the camera aperture 32 with the lip 48 being pressed against the interior of the first portion 14. To achieve the snap-fit connection with the camera aperture 32, the camera protection module 34 may include a ridge 53 protruding a distance away from and extending along a portion of the base element 36. The ridge 53 operates to create a recess 55 between the lip 48 and the ridge 53. As the camera protection module is inserted within the aperture 32, the ridge 53 may be pressed against a raised portion surrounding the aperture 32, such that the raised portion snap-fits within the recess 55 releaseably securing the camera protection module 34 to the first portion 14.

To remove the camera protection module 34 from the first portion 14, a pushing force applied to the first tapered portion 44 and the second tapered portion 46 may dislodge the camera protection module 34 from the camera aperture 32. This design allows the camera protection module 34 to be removeably insertable within variously sized mobile device case housings 12 and/or variously sized camera apertures 32. Alternatively, the base 36 may be molded or otherwise integrated into the housing 12 such that it is not a modular component. In particular, the housing 12, for example the first portion 14, may define or otherwise include the base element 36 which defines first aperture 38, the second aperture 40, the septum 42, and the related features described above and below with respect to the camera protection module 34.

The camera protection module 34 may further include a flexible or rigid membrane 52, which may be transparent and sized to span the first aperture 38 and the second aperture 40. The membrane 52 may be coupled to the camera protection module 34 at the widest diameter portion of the first tapered portion 44 and the second tapered portion 46 or alternatively be coupled to the camera protection module and the smallest diameter portion of the first tapered portion 44 and the second tapered portion 46. The membrane 52 shields the camera and the lens from debris and scratching. The membrane may be a single piece spanning both the first aperture 38 and second aperture 40 or, as shown in FIG. 4, may be two separate portions corresponding to the first aperture 38 and the second aperture 40 and separated by the septum 42.

The camera protection module 34 may further include a cushion element 54 extending from the base element 36. The cushion element 54 may define a similar shape to that of the base element 36, or any shape, such that the cushion element 54 does not obstruct the first aperture 38 or the second aperture 40. The cushion element 54 may further extend a distance away from the base 36 into the interior of the first portion 14 when affixed to the housing 12 to prevent light leakage from the flash interfering with the camera lens when disposed within the housing 12. In particular, the cushion element 54 may be composed of a soft resilient material, for example, silicon, thermoplastic polyurethane, or foam. The cushion element 54 may further operate to prevent the camera protection module 34 from being dislodged from the aperture 32 when a mobile device is disposed within the first portion 14 by absorbing part of the force exerted by the mobile device on the camera protection module 34 when being pressed into the mobile device case.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A mobile device protection system for a mobile device having a camera, the mobile device protection system comprising:
- a mobile device case sized to releaseably retain the mobile device, the mobile device case having an aperture; and
- a camera protection module having:
  - a base, the base having a first orifice and a second orifice, the camera protection module being disposed within the aperture;
  - a first tapered width portion surrounding the first orifice;
  - a second tapered width portion surrounding the second orifice; and
  - the first tapered width portion extending upward and outward from the first orifice and the second tapered width portion extending upward and outward from the second orifice.

2. The system of claim 1, wherein the first orifice and the second orifice are separated from each other.

3. The system of claim 2, wherein a shape of the first orifice and a shape of the second orifice are different.

4. The system of claim 2, further including a first substantially transparent membrane affixed to the camera protection module and covering the first orifice and a second substantially transparent membrane affixed to the camera protection module and covering the second orifice.

5. The system of claim 1, wherein the camera protection module has a septum between the first orifice and the second orifice.

6. The system of claim 1, wherein the camera protection module is integral with the mobile device case.

7. The system of claim 1, wherein the camera protection module is removeably insertable within the aperture.

8. The system of claim 1, wherein the mobile device case includes a first alignment element proximate the aperture, and wherein the camera protection module includes a second alignment element matable with the first alignment element.

9. The system of claim 1, wherein the camera protection module is at least partially composed of resilient material.

* * * * *